US008069354B2

(12) United States Patent
Min

(10) Patent No.: US 8,069,354 B2
(45) Date of Patent: Nov. 29, 2011

(54) POWER MANAGEMENT FOR SYSTEM HAVING ONE OR MORE INTEGRATED CIRCUITS

(75) Inventor: John S. Min, San Jose, CA (US)

(73) Assignee: MIPS Technologies, Inc., Sunnyvale, CA (US)

( * ) Notice: Subject to any disclaimer, the term of this patent is extended or adjusted under 35 U.S.C. 154(b) by 770 days.

(21) Appl. No.: 11/838,648

(22) Filed: Aug. 14, 2007

(65) Prior Publication Data

US 2009/0049312 A1    Feb. 19, 2009

(51) Int. Cl.
*G06F 1/32* (2006.01)
(52) U.S. Cl. ........ 713/300; 713/310; 713/320; 713/322; 713/323; 713/324
(58) Field of Classification Search ............ 713/300, 713/320, 322, 323, 324
See application file for complete search history.

(56) References Cited

U.S. PATENT DOCUMENTS

| | | | |
|---|---|---|---|
| 4,324,184 A * | 4/1982 | Sullivan | 104/279 |
| 6,119,241 A * | 9/2000 | Michail et al. | 713/322 |
| 6,564,328 B1 | 5/2003 | Grochowski et al. | |
| 6,611,920 B1 | 8/2003 | Fletcher et al. | |
| 6,687,838 B2 | 2/2004 | Orenstien et al. | |
| 6,845,456 B1 * | 1/2005 | Menezes et al. | 713/320 |
| 6,883,107 B2 | 4/2005 | Rodgers et al. | |
| 6,986,066 B2 | 1/2006 | Morrow et al. | |
| 7,080,267 B2 * | 7/2006 | Gary et al. | 713/300 |
| 7,111,179 B1 | 9/2006 | Girson et al. | |
| 7,137,117 B2 | 11/2006 | Ginsberg | |
| 7,173,450 B2 * | 2/2007 | Atkinson | 326/30 |
| 7,206,951 B2 * | 4/2007 | Ishibashi et al. | 713/323 |
| 7,434,072 B2 * | 10/2008 | Peirson et al. | 713/300 |
| 7,604,399 B2 * | 10/2009 | Twerdochlib et al. | 374/130 |
| 2003/0088799 A1 * | 5/2003 | Bodas | 713/320 |
| 2004/0039954 A1 * | 2/2004 | White et al. | 713/322 |
| 2004/0216106 A1 | 10/2004 | Kalla et al. | |
| 2006/0020831 A1 | 1/2006 | Golla et al. | |
| 2006/0136915 A1 | 6/2006 | Aingaran et al. | |
| 2006/0190945 A1 | 8/2006 | Kissell | |
| 2006/0190946 A1 | 8/2006 | Kissell | |
| 2006/0195683 A1 | 8/2006 | Kissell | |
| 2006/0242436 A1 | 10/2006 | Peirson et al. | |
| 2007/0043935 A2 | 2/2007 | Kissell | |
| 2007/0044105 A2 | 2/2007 | Kissell | |
| 2007/0044106 A2 | 2/2007 | Kissell | |
| 2007/0113013 A1 | 5/2007 | Knoth | |
| 2007/0113050 A1 | 5/2007 | Knoth | |
| 2007/0113053 A1 | 5/2007 | Jensen et al. | |
| 2008/0046652 A1 | 2/2008 | Knoth et al. | |
| 2008/0046653 A1 | 2/2008 | Knoth et al. | |
| 2008/0313471 A1 * | 12/2008 | Huang et al. | 713/185 |

* cited by examiner

*Primary Examiner* — Nitin C. Patel
*Assistant Examiner* — Zahid Choudhury

(57) ABSTRACT

Power management control software including power management policies is provided with those policies divided into observation code and response code. When predetermined execution points within the operating system 2 are reached or an application specific task is executed, registered observation code is triggered and executed to store event data within an event data store. The operating system subsequently executes the response code to read the event data from the event data store and generates power control predictions and control signals therefrom.

22 Claims, 9 Drawing Sheets

POWER MANAGEMENT FOR SYSTEM HAVING ONE OR MORE INTEGRATED CIRCUITS

BACKGROUND OF THE INVENTION

1. Field of the Invention

This invention relates to the field of integrated circuits. More particularly, this invention relates to power management control within a system comprising one or more integrated circuits.

2. Description of the Prior Art

It is known to provide integrated circuits with power management control mechanisms that are typically a combination of hardware and software to control the supply voltage and clock frequency of an integrated circuit. This control matches performance requirements of the applications and processes being executed with appropriate levels of voltage and frequency thereby reducing the energy consumed by the integrated circuit. In particular, this technology reduces the operating voltage and clock frequency to just exceed the required performance which has been determined without providing an excess of performance which would needlessly waste energy.

Whilst such techniques and technology are useful, one problem that arises is that the control software that determines the required performance and monitors the system should not in itself degrade the system performance by, for example, increasing the latency associated with certain normal operational tasks, such as task switching. It is desirable to be able to provide power management and control mechanisms that are transparent to the user and that are based on the current workload of the system.

SUMMARY OF THE INVENTION

Viewed from one aspect, the present invention provides a method of controlling power consumption of one or more integrated circuits in a system. The present technique recognizes that the power management control software can be divide into different portions, namely an observation portion and a response portion and combined with one or more hardware features to implement application specific power management. The observation portion captures data characterizing certain observed events occurring within the system. These events are part of the normal operation of the system and accordingly their observation and recording should be quick and non-intrusive. The other portion of the power management control software deals with the response to the observed and stored event data. This response can execute one or more algorithms to analyze the captured event data and generate predictions for required performance which may be used to control the integrated circuit. The observation task by being separated out can be stripped down to be quick, simple and bounded such that it does not intrude to a significant degree upon the normal operation of the system. The response activities are generally more complex and can be unbounded in extent. However, the response can be separately triggered at an appropriate time such that it will not have an undue effect upon the perceived performance or the latency of the system. The present technique, divides out the observation and event data storage as triggered by certain execution points being reached from the response activity which is triggered independently of those the execution points being reached.

It will be appreciated that the response activity could be triggered in a variety of different ways, preferred techniques include use of a timer monitored by the operating system computer program or a dedicated power management task that assigned a lower priority than other user invoked applications.

The event data recorded can vary, preferred examples of event data include a timestamp, a task identifier of a currently executing task, a currently set performance level of the integrated circuit, an identifier of an execution event corresponding to the event data recorded and/or an indication of whether the currently executing task is the idle task. It will be appreciated that further data may also be recorded as desired by a particular observation mechanism.

The power consumption of one or more integrated circuits can be controlled and adjusted in various ways, such as by selectively shutting down certain power domains, zones or devices. Preferred embodiments of the invention utilize dynamic control of operating voltage and clock speed to control power consumption in a manner determined by the response mechanisms.

The performance control may work in a variety of different ways, but in one preferred embodiment the computer program is operable to detect the scheduled execution of one or more application computer programs and the power consumption is controlled to give a substantially minimum level of processing performance required to meet processing requirements of the one or more currently executing application programs.

In some embodiments, a power management kernel determines which of a plurality of instances of observation code are associated with that execution point and in turn trigger execution of those instances of observation code which are associated with the execution point. Thus, different power management policies with associated observation requirements and response requirements (algorithms) can be provided as desired to link execution points to those policies as desired. In other embodiments, the power management kernel determines that selected observation code has been invoked by an application specific task.

Each observation instance may have an associated instance of response code and all instances of the response code may be triggered to execute from the same stimulus or the response code may be selectively triggered based on an application specific basis. Thus, all the responses can be determined irrespective of which instances of observation code have or have not been executed since these two functions are distinct.

Viewed from another aspect the present invention provides an integrated circuit comprising:

a processor operable to execute at least one computer program including at least one execution point corresponding to an execution event to be logged or alternatively by selection of an application specific task;

observation logic operable upon execution of said at least one execution point or application specific task to store event data characterizing one or more parameters associated with said execution event; in an event data scoreboard;

response logic operable independently of execution of said at least one execution point to read said event data from said event data scoreboard and in dependence upon said event data to generate one or more power control commands; and a power controller responsive to said one or more power control commands to control power consumption of said integrated circuit.

Viewed from a further aspect the present invention provides a computer program product carrying a computer program for controlling an integrated circuit and, alternatively other integrated circuits that cooperate together to provide selected functions. The invention further comprises executing an operating system computer program comprising:

observation code generated in response to execution of said at least one execution point or application specific task to store in an event data store event data characterizing one or more parameters associated with said execution event;

response code triggered independently of or alternatively, in conjunction with, observation code to read said event data from said event data store and in dependence upon said event data to generate one or more power control commands; and power command generating code operable in response to said one or more power control commands to control power consumption of said integrated circuit.

The above, and other objects, features and advantages of this invention will be apparent from the following detailed description of illustrative embodiments which is to be read in connection with the accompanying drawings.

DESCRIPTION OF THE PREFERRED EMBODIMENTS

Figure 1:
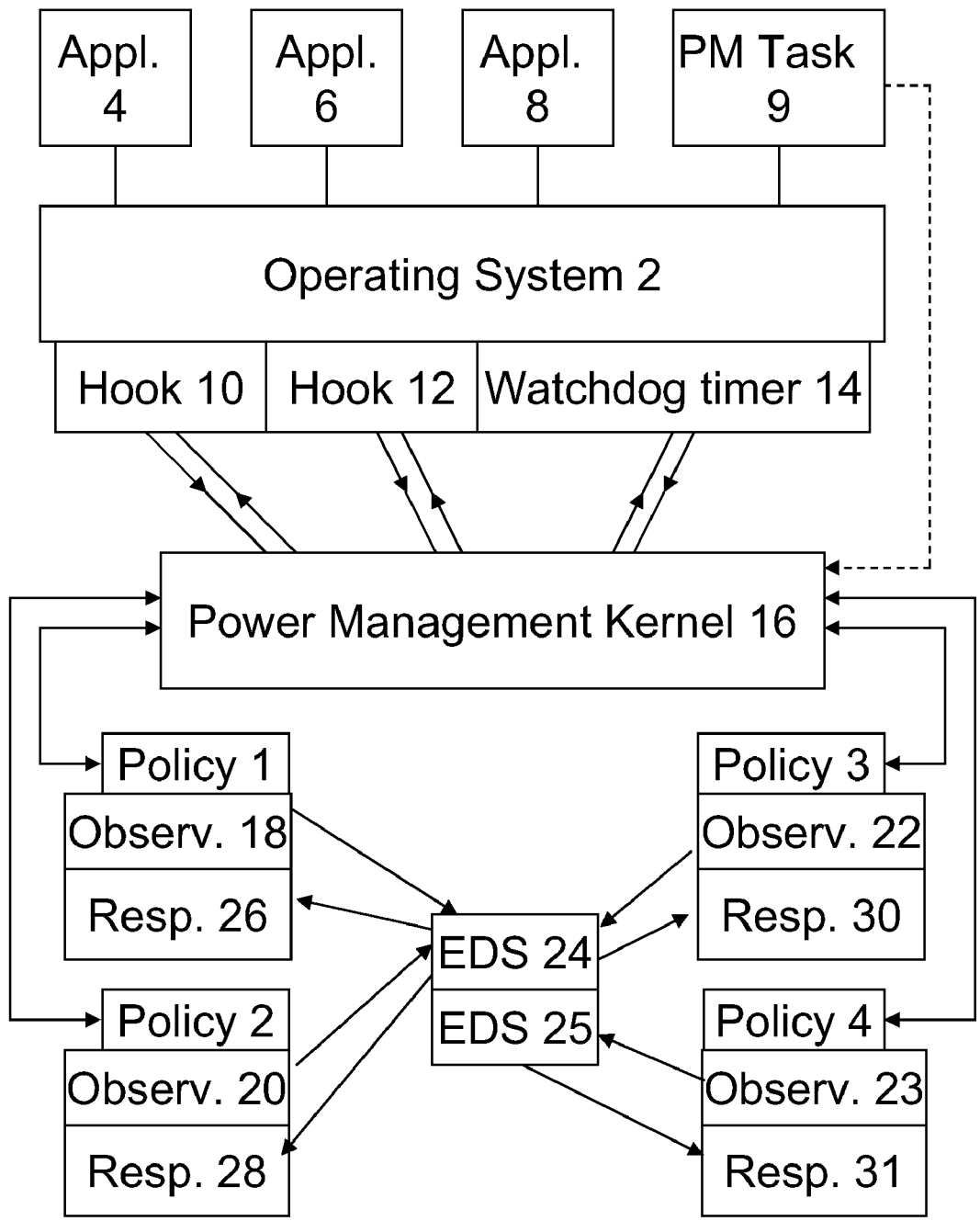
FIG. 1 schematically illustrates the present technique of divided observation and response in power management control.

FIG. 1 shows an operating system 2 controlling and scheduling to execution of multiple application programs 4, 6, 8. The action of an operating system 2 in task scheduling such application programs 4, 6, 8 is conventional in the field of operating systems. Within the operating system 2 are provided multiple "hooks" 10, 12 which are associated with the execution point of the operating system 2 reaching respective positions. These execution points 10, 12 are associated with events of significance to power management control, such as task switching, stalls, starting of new applications and the like. The operating system 2 also includes a timer service 14 which can be used to trigger certain actions when a timer reaches predetermined values.

As illustrated in FIG. 1, execution point 10 is reached and this serves to trigger entry to a power management kernel 16. The power management kernel 16 is passed the identity of the execution point 10 as well as other data such as the currently executing task id, known to the operation system, to a timestamp, the type of execution point reached and whether or not the currently executing task is an idle task. The power management kernel 16 uses the type of execution point indication to determine which of a plurality of power management policies (Policy 1, Policy 2, Policy 3) are registered as having observation code 18, 20, 22 which should be executed when that execution point 10 is reached. In this example, the observation code 18 and 20 for Policy 1 and Policy 2 is so registered and the observation code 22 of Policy 3 is not registered. The observation code 18 is then triggered and executed to write desired event data within an event data store 24 and then a return is made to the power management kernel 16. The same sequence is repeated for observation code 20. The power management kernel 16 then returns execution to the point immediately following the execution point 10 and the operating system 2 proceeds. The observation code 18, 20 is relatively short and rapid to execute and its time to execute will generally be predictable. Thus, the capture of the event data within the event data store 24 upon execution of the execution point 10 is relatively quick and non-intrusive.

At some later time and independently of the execution points 10, 12 being executed, the timer service 14 reaches a point corresponding to the power management kernel 16 being entered at step "a" so as to execute the instances of response code 26, 28, 30 associated with the different policies. Each of these instances of response code 26, 28, 30 is executed in turn and serves to read the event data from the event data store 24 and determine its power control prediction based upon the stored event data which has previously been captured by the observation code 18, 20, 22 upon the various execution points 10, 12 having been reached. The execution of the various instances of the response code 26, 28, 30 may occur either singularly or as part of a group. Finally, when the available instances of response code 26, 28, 30 have been executed, a return is made from the power management kernel 16 to the operating system 2. The power management kernel 16 also consolidates the predictions generated by the different response code 26, 28, 30 to produce an overall power control command that is applied to the integrated circuit so as to vary its operating voltage or operating frequency.

As further illustrated in FIG. 1, the operating system 2 can also schedule execution of a power management task 9 that it is not discernable by a human. For example, operating system 2 may execute task 9 in the background in a privileged mode. When power management task 9 is executed, it triggers immediate entry to power management kernel 16 (also referred to herein as PMK 16) via step "1A". The power management kernel 16 is passed the task identity as well as other data to specify an application specific power management policy, such as Policy 4. The power management kernel 16 uses the power management policy specified by task 9 to invoke execution of observation code 23. Thus, when task 9 is selected by operating system 2, observation code 23 is executed to write desired event data within an event data store 25. As noted with respect to observation code 18, and 20, observation code 23 is relatively short and rapid to execute and its time to execute will generally be predictable and not perceptible to a user. Thus, the capture of the event data within the event data store 25 occurs in a non-intrusive manner whenever task 9 is selected to execute.

Rather than executing a return to the power management kernel 16, response code 31 immediately executes. Since task 9 executes in privileged mode, it may override the watchdog timer by setting or resetting watchdog timer service 14 to a desired value. This override ability is useful to mesh the timer service 14 with task 9 defined power management policy. Advantageously, task 9 enables a manufacturer to tailor a power management policy to a specific application without having to modify the operating system. Task 9 can be configured, for example, to prevent the operating system from reaching hooks 10 or 12 so that power management is solely driven by task 9.

Task 9, in one embodiment, only executes when selected by the operating system 2 which usually occurs when none of the other tasks is making a demand on system resources by immediately invoking the power management kernel 16 and specifying the selected policy. It will be appreciated that when task 9 is invoked, it eliminates the latency associated with waiting for one of the hooks to invoke an appropriate response code 26, 28 or 30. Advantageously, Policy 4 is application specific and may be changed by a system administrator without requiring modification of the operating system. Thus, power management kernel may selectively consolidate the predictions generated by the different response code 26, 28, 30 or 31 to produce an overall power control command or it may merely apply the policy identified by task 9. The selected consolidated policies or, alternatively the selected policy specified by task 9, is applied to the integrated circuit to vary its operating voltage or operating frequency.

Figure 2:
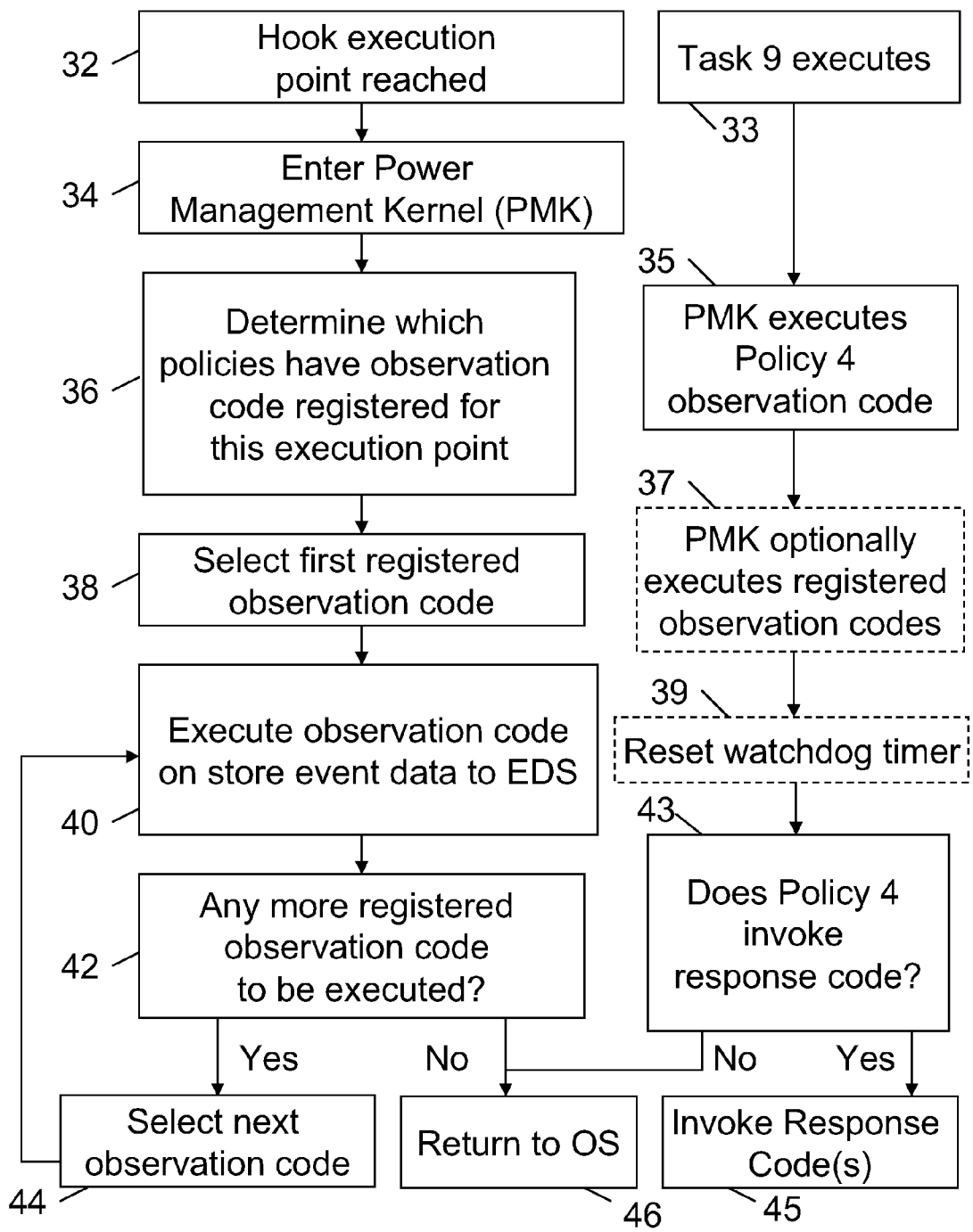
FIG. 2 is a flow diagram schematically illustrating the triggering and execution of observation code in accordance with an embodiment of the present invention.

FIG. 2 is a flow diagram schematically illustrating the triggering and execution of the observation code 18, 20, 22. As indicated at 32, the system waits until an execution point 10, 12 is reached. When such a point is reached, as indicated at 34, control is passed to power management kernel 16. The power management kernel 16 determines, as indicated at 36, which of the policies have observation code 18, 20, 22 registered to be executed for this execution point.

As indicated at 38, the power management kernel 16 selects the first of these registered observation code instances and then, as indicated at 40, executes this observation code. Execution of the observation code includes storing event data to the event data store 24. This event data can include the task id of the currently executing task within the application programs 4, 6, 8 being controlled by the operating system 2. Further event data may include a timestamp, a currently employed performance level, a type of execution point reached, or an indication that the task currently being executed by the operating system is an idle task. Still other items specific to a particular instance of observation code may also be included as part of the event data. Hardware counters and the like may also be provided and read by the observation code to monitor performance related statistics for the integrated circuit.

As indicated at 42, the power management kernel checks whether there are any more instances of observation code to be executed. If there are such instances, then, as indicated at 44, the power management kernel 16 selects the next instance of observation code to be executed as indicated at 40. If the determination is that there are no further registered instances of observation code to be executed for the execution point concerned as indicated at 42, then operation, as indicated at 46, returns execution to the operating system.

However, if task 9 executes, as indicated at 33, then the operations indicated at 32-44 of the above described procedure are bypassed and the power management kernel 16 executes the observation code 23 specified by Policy 4 as indicated at 35.

Execution of observation code 23 includes storing event data to the event data store 25 (see FIG. 1) This event data can include the task id of the currently executing task as well as the status of any other application program 4, 6 or 8 being controlled by the operating system 2. It will be appreciated that event data could also include a timestamp, a currently employed performance level, an indication of any execution point reached by execution of the operating system 2, an indication of whether the task currently being executed by the operating system is an idle task. Still other event date could include other operational details items specific to a particular instance of observation code, such as temperature, device utilization statistics, or work load statistics. Other hardware or software counters are also preferably provided and these counters are read by the observation code to monitor performance related statistics for the integrated circuit.

Policy 4 may optionally execute other registered observation codes as indicated at 37 which is illustrated as a dashed box to indicate the optional nature of this feature. One skilled in the art will appreciate that since Policy 4 is application specific the execution of any other registered code may be selectively enabled such that in some embodiments, the PMK 16 may execute each of the registered observation codes while, in other embodiments, the PMK 16 may selectively execute one or more registered observation code or, in still other embodiments, simply ignore all of the registered observation code.

However, it is typical to expect that when the power management kernel is entered by a task 9 request, no other relevant instances of observation code will be registered for execution. In other instances, if task 9 invokes the power management kernel, it may be desired to ignore any other event data previously saved by execution of observation code 18, 20 or 22 and immediately proceed to invoke execution of the response code 31. In such embodiment, the registered observation codes are not executed. Accordingly, power management kernel 16 immediately triggers execution of the response code 31 before control is passed back to the operating system as indicated at 46 without executing any other observation code. In other embodiment, event data in EDS 24 may be combined event data in EDS 25 such that all existing event data is used when control is passed to response code 31. This embodiment provides a two tier power management scheme such that if one or more application programs 4, 6, 8 is active, power management is determined in response to observation code 18, 20 or 22 and when no other application program is active, power management is determined by the application specific power management features determined by task 9. Thus, if an application 4, 6 or 8 had previously stored data into event data store 24, task 9 may selectively ignore this data store and immediately implement Policy 4 to manage power.

Policy 4 may also optionally specify that the watchdog timer be reset. The optional nature of this operational aspect of the PMK 16 is illustrated by the dashed box 39. In one embodiment, the watchdog timer is set to a nominal value such that the operating system 2 schedules response code 31 to execute substantially immediately after observation code 23 has completed execution. In this embodiment, control is initially passed back to the operating system 2 as indicated at 46. Then execution of the response code is triggered by the operating system when the watchdog timer counts down from the nominal value.

In other embodiments, the watchdog timer is reset to an initial value that is much larger than a nominal value. This initial value may be selectively determined by a work load analysis or may be a fixed value stored in memory. In this embodiment, the PMK 16 and observation code 23 can either invoke the response code 31 as indicated at 43 and 45 or it can pass control back to the operating system depending on the dictates of Policy 4. To illustrate, if, while observation code 23 is executing, an interrupt is received, control would pass back to the operating system 2 after the watchdog timer has been reset. Thereafter, operation of SoC proceeds in normal fashion to handle the interrupt. Subsequently, when watchdog timer counts down, the operating system would trigger execution of any registered response code 26, 28, 30 and/or 31.

Figure 3:
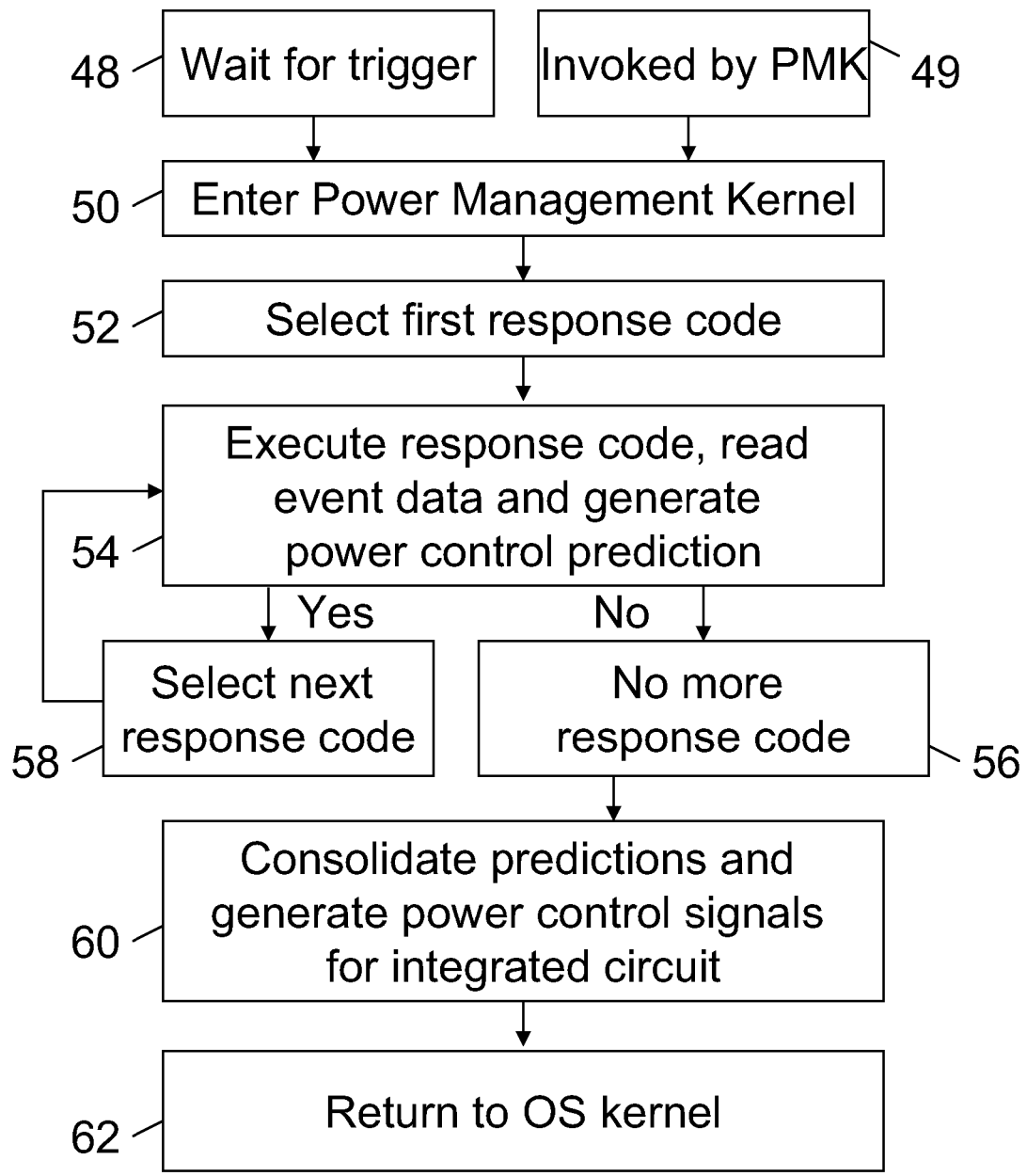
FIG. 3 is a flow diagram schematically illustrating the triggering and execution of response code in accordance with an embodiment of the present invention.

After the optional reset of watchdog timer as indicated at 39 and/or after execution of any optional observation code, Policy 4 may dictate that the observation code 23 invoke the response code 31 without returning to the operating system 2 as indicated at 45. Thus, PMK 16 immediately invokes response code which is very advantageous because it eliminate the inherent latency associated with initiating the management of power when the response code is invoked by policy 1, 2 or 3. FIG. 3 is a flow diagram schematically illustrating various mechanisms for triggering execution of response code 26, 28, 30 and/or 31. As indicated at 48, one mechanism for triggering execution of the response code is to wait for the operating system to generate a timer trigger or more specifically, when the watchdog timer times out and an interrupt is generated for the operating system to transfer control to the PMK 16. Another mechanism is to trigger execution of the response code 31 in response to task 9 being executed as indicated at 49.

Regardless of how invoked, control is passed to the power management kernel 16 as indicated at 50 once either the trigger occurs or Policy 4 directs PMK 16 to directly invoke the response code. The power management kernel 16, as indicated at 52, selects the first instance of response code 26 to be executed. As indicated at 54, power management kernel 16 then executes the selected response code including reading event data from the event data stores 24 and 25 and generates a power control prediction for that policy or policies.

As indicate at 56, the power management kernel 16 determines whether any more response code is present to be executed. It will be noted that all of the instances of response code 26, 28, 30 or 31 which are registered with the power management kernel 16 in respect of a given hook or task will be executed since any of these may be able to make a worthwhile prediction based upon the event data stored within the event data stores 24 and 25. If there is at least one further instance of response code to be executed, then processing proceeds, as indicated at 58, at which the next instance of response code is selected and processing proceeds to execute the response code as indicated at 54. If all the instances of response code have been executed, then the power management kernel 16, as indicated at 60, consolidates the predictions of the individual response code 26, 28, and/or 31 and generates an overall power control signal to be applied to the integrated circuit.

As indicated at 62, the power management kernel 16 then terminates and returns control to another application selected by the operating system.

If the power management kernel 16 retains control once the observation code specified by Policy 4 is executed, the response code 31 may be immediately invoked without passing control back to operating system 2. Triggering execution of the response code selected by the application specific policy enables the SoC to rapidly generate one or more power control commands. This rapid implementation of power control predictions minimizes the latency between determining the proper power management policy and implementing such policy thereby increasing power efficiency, prolonging battery life and better managing the resources of the SoC.

Figure 4:
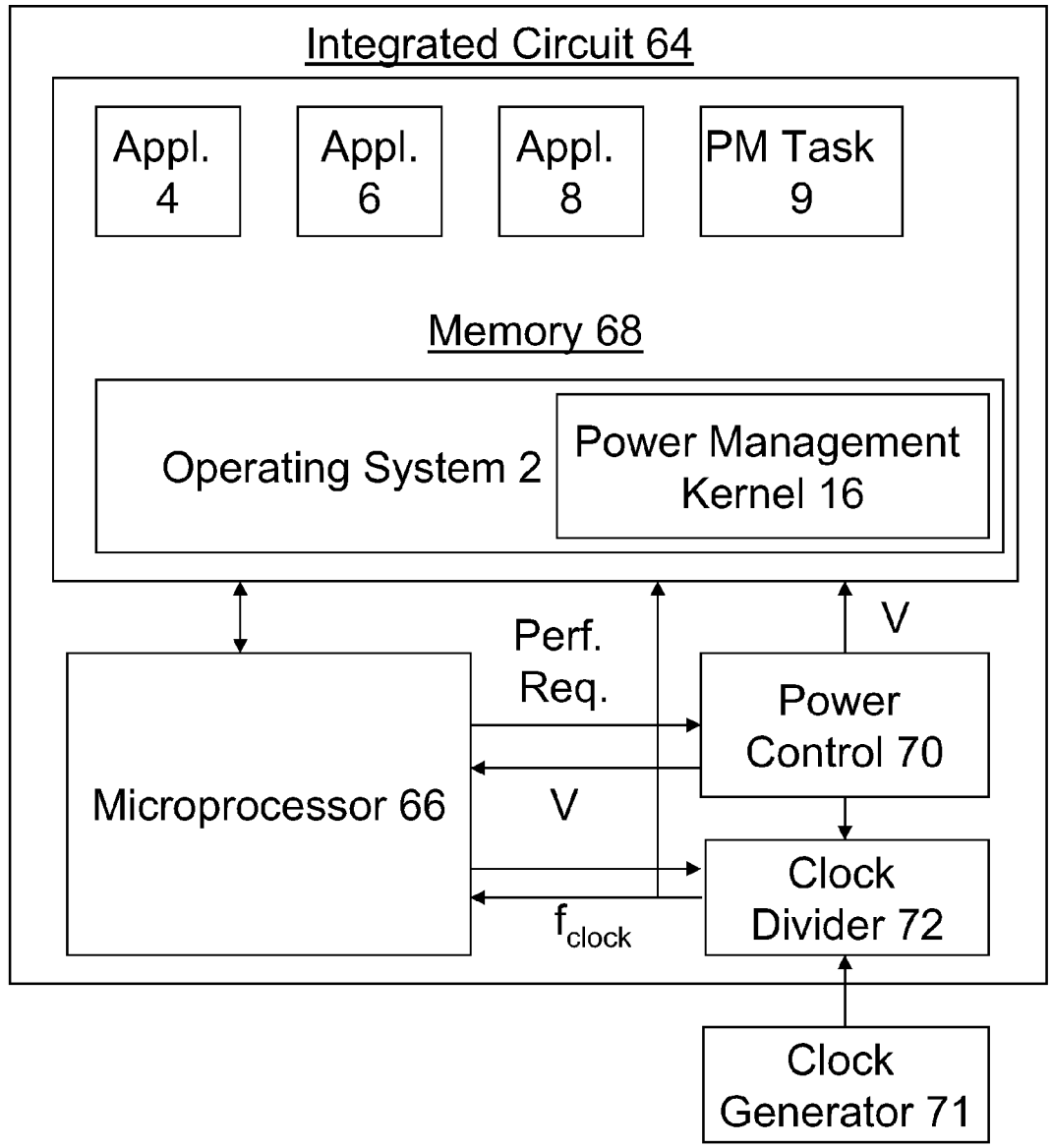
FIG. 4 is a schematic diagram illustrating an integrated circuit using the present techniques in accordance with an embodiment of the present invention.

FIG. 4 schematically illustrates an integrated circuit 64 including a microprocessor core 66, a memory 68, a power control circuit 70 and a clock divider 72 that receives a clock signal from clock generator 71. Note that "microprocessor core" is also commonly referred to in the art as a processor core or simply as a processor and it is intended that such phrases when used herein be construed broadly such that reference to one such phrase includes the others unless specifically stated otherwise.

Typically, clock generator 71 will always run at a full system speed and clock divider 72 is responsible for dividing the clock by an integer multiple ranging from zero to n where n may be any integer greater than or equal to 2. The memory 68 stores computer code which includes an operating system 2, power management kernel 16 which includes the various policies, observation code, response code as well as other power control code. Application programs 4, 6, 8, task 9 and other computer code directed to performing other functions are also stored in the memory 68. The computer code from the memory 68 is executed upon by the microprocessor core 66 and logic 69 with data and commands transferred there-between by bus 67. This execution performs the techniques illustrated in FIGS. 1, 2 and 3 as well as execution of the application programs 4, 6, 8 and other processing tasks such as task 9.

Power management kernel 16 controls the processing performance of the SoC 64 to be equal to substantially the minimum required performance for the currently executing application programs 4, 6, 8. This power management kernel 16 saves energy and thereby improves battery life etc. Execution of the power management kernel 16 generates a performance requirement signal 74 which is supplied to a power controller 70. The power controller 70 uses this performance requirement signal 74 to determine an operating voltage V to be supplied to the microprocessor core 66 and to various zones of SoC 64. The power controller 70 also controls a clock divider 72. The clock divider 72 adjusts, in real-time, the operating clock frequency being supplied from clock generator 71 to the processor core 66, bus 67, logic 69 and memory 68 and other zones of SoC 64. In other embodiments, power control 70 is adapted to determine the operating voltage and clock frequency of other devices that are coupled to SoC 64. Thus, power control 70 may be used to manage a display screen, user interface logic, coprocessors and other such peripheral devices.

One mechanism for invoking power management kernel 16 is with task 9. Task 9 will typically be assigned a low priority and may not be executed if other, higher priority application programs are executing. In this situation, power management defaults to those parameters specified by policies invoked when one of the hooks in the operating system are executed. However, task 9 provides an application specific mechanism to manage power without having to modify or customize the operating system 2. Advantageously, a manufacturer of a device, such as a cell phone, personal digital assistant, DVD player or other device that is operated under the control of a processor can specify a device specific or an application specific policy without having to modify the operating system for each device type. Task 9 can be configured to prevent operating systems from reaching hooks 10 or 12 so that power management is solely driven by task 9.

In accordance with an embodiment of the present invention, the watchdog timer 14 enables the power control commands invoked by task 9 to progressively adjust the voltage, frequency or both voltage and frequency applied to selected zones of the integrated circuit. Advantageously, since operating system 2 may consider task 9 to be the default application, it may be retained in memory even if the device is otherwise placed into a sleep or other low power mode. Thus, if the integrated circuit is idle for a period of time, voltage, frequency or both voltage and frequency may be progressively reduced. Advantageously, task 9 can be tailored to each specific application so that the period of time is matched to the anticipated environment.

To illustrate the flexibility provided by the present invention, consider the application where the integrated circuit 64 is part of a cellular device and active applications are all idle while waiting for a response from a network connection. Since the anticipated delay before the arrival of a packet from a network connection is typically rather short, the response code can selectively reduce voltage, frequency or both voltage and frequency by to a first value for both voltage and/or frequency. If the connection is slower than anticipated, the response code can further select other values in accordance with the policy while waiting for the arrival of a packet from the network connection. The period of time between adjustments is preferably determined by the watchdog timer and can be specified as being, by way of example, a few microseconds or several hundred of microseconds.

In other circumstances, the integrated circuit 64 may be in a mode where the most recently active applications are all idle and the integrated circuit is waiting for input from a user. In such instances, the anticipated delay may be on the order of several hundred of microseconds to several seconds or longer. Thus, the policy may specify a more aggressive initial value for both the voltage and/or frequency to reduce power consumption while waiting. In other embodiments, the policy may initially put the integrated circuit into a sleep mode until such time that an interrupt is generated.

Task 9 may change the policy by storing new observation and response code in memory 68 to be executed by power management kernel 16 in response to changes in the operating environment.

While the above described enhancement to the operating system 2 provides a coarse grain mechanism for reducing power on an integrated circuit, the use of policies implemented by the operating system may not maximize the power savings by the integrated circuit. Rather, there are certain circumstances that arise when the processor is executing a task and the operating system does not have sufficient visibility or ability to respond to opportunities to minimize power consumption in the integrated circuit in a timely manner. Accordingly, the present invention further includes various fine grain mechanisms for achieving additional power savings associated with microprocessor 66 even if power management kernel 16 has not been invoked by operating system 2 or task 9.

Figure 5:
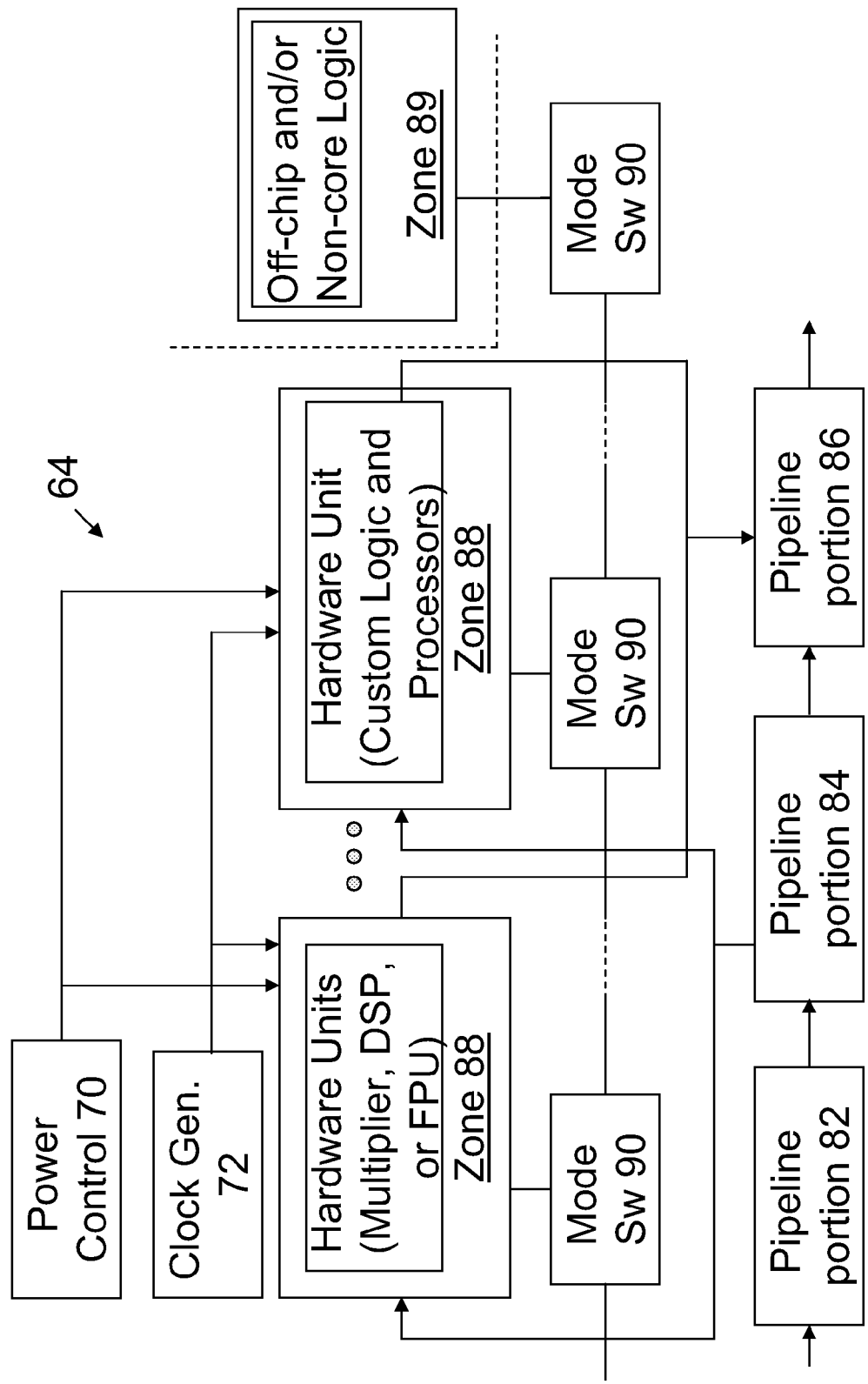
FIG. 5 is a schematic diagram illustrating an integrated circuit using the present techniques in accordance with an embodiment of the present invention.

FIG. 5 schematically illustrates one embodiment of a system having one or more integrated circuits and a fine grain power management mechanism in accordance with the present invention. The power management mechanism may be invoked by task 9 or the various response code modules in conjunction with the above described power management of the integrated circuit 64. With reference to FIGS. 4 and 5, note that the processor 66 includes a first pipeline portion 82 that is responsible for fetching instructions and data from memory 68 and for decoding the instructions. One skilled in the art will recognize that pipeline portion 82 may include any number of units (such as by way of example, a fetch unit, a decode unit, a scheduler etc.) depending on the specific processor architecture.

A second pipeline portion 84, also referred to as the execution portion, is responsible for executing instructions and manipulating registers. This portion typically includes at least one set of registers, arithmetic logic units (ALUs), hardware multipliers, floating point processors (FPUs) and other such hardware units. Portion 84 may also include closely coupled memory such as a cache or scratchpad ram, translation lookaside buffer (TLB) units and other such devices to speed operation of the processor (not separately illustrated).

A third pipeline portion 86 is responsible for writing or committing results to memory. One skilled in the art will recognize that the above description describes a pipelined RISC processor such as a processor that executes the MIPS instruction set. MIPS processors are widely licensed for a variety of embedded applications by MIPS Technologies, Inc., the assignee of the present invention, where power management is a primary requirement. However, it will be appreciated by one skilled in the art that other processors types, such as a CISC processor, or processors that execute other instruction sets may utilize the present invention and that the various embodiments of the present invention may be adapted to a variety of uses other than merely embedded applications.

It is common in the art for high performance processors to include hardware units dedicated to performing certain types of mathematical operations. For example, the processor core may include one or more hardware units such as one or more multiplier units, one or more FPUs, one or more DSPs, a coprocessor or custom logic (collectively, "core logic" and individually a "unit of core logic") closely coupled to the processor. Core logic is typically used to execute specific instructions (or sequence of instructions) or to implement application specific instructions provided by processor 66. Unfortunately, such hardware units typically consume significant amounts of power and may be seldom used when some applications are executing. Since the above described hardware units are relatively large logic blocks (in terms of the number of logic gates), the present invention provides a mechanism where the processor 66 can dynamically manage power and performance levels in response to the actual work load associated with an application 4, 6 or 8 or task 9. Accordingly, in one preferred embodiment, each such unit of core logic is each positioned in an individual zone 88.

Note that any number of zones 88 may be provided on the integrated circuit such that the power may be managed for each unit of core logic. Within each zone 88, the voltage and frequency may be selectively modified to control the operating parameters of hardware units. Each of the plurality of zones 88 are preferably separately controllable such that the voltage or frequency or both voltage and frequency applied to a zone can be changed without affecting the pipeline portions 82, 84 and 86. Preferably, the hardware units in each of the zones 88 may be selectively placed in a full power, full frequency operating mode, or a low power, low frequency operating mode. Alternatively each of the zones may be placed in a sleep mode to minimize power during periods where these units are not in use. Preferably, when zones 88 are in the sleep mode, the pipeline portions 82-86 may function at a level appropriate to the workload independently from the mode of zones 88.

In one embodiment, the operating mode of each zone is determined by a separate mode switch 90. Mode switch 90 is a register that uses at least two bits to identify whether each defined zone is to be configured for high performance, intermediate performance, low performance or quiescent sleep (disabled with no power/no frequency) mode. Each performance level corresponds to a selected voltage level and clock frequency for the respective zone. In other embodiments, the mode switch 90 uses a single bit to select either a high performance mode or a disabled mode low power mode. In still other embodiments, mode switch 90 may comprise a plurality of bits to provide incremental control in response to the processor's work load.

In addition to the core logic, the power management scheme is extendable to controlling logic outside of the core.

In operation, processor 66 on integrated circuit 64 manages power for the off-chip or non-core logic instantiated in zones 89 in response to the policy selected by power management kernel 16.

As illustrated in FIG. 5, at least one mode switch 90 is configured to control one or more zones 89 of off-chip or non-core logic units. For example, one or more mode switches can be dedicated to controlling power and performance levels for off-chip hardware units or other non-core logic. It will be appreciated that off-chip logic and/or non-core logic may comprise one or more dedicated processors such as a high definition (HD) video processor, a HD audio codec, a DSP processor or other co-processors depending the specific functions for which the device was designed to perform. It is often an engineering decision to partition system level logic among one or a plurality of discrete integrated circuits. Accordingly, while the logic controlled by mode switch 90 may reside on a common integrated circuit, it is still common for a multi-function device to have multiple integrated circuits. In such instances, processor 66 can control the power and performance levels of one or more integrated circuits.

To illustrate, operation of the power management and performance control feature of the present invention, consider the effect of activating a mute button on a device having audio functionality. In response to the user selection, the selected policy places the zone 88 that contains the audio codec and the DSP processors into a sleep mode because there is no current need to use these components. To easily modify which policy is activated in response to the user's input, the priority assigned to task 9 may be increased such that it is invoked by the operating system whenever selected interrupts occur.

Once task 9 is selected, the observation code is configured to store a value in the mode switch register that sets the power mode to conserver power in the zones having the hardware units or logic that are affected by the user's selection and that, in response to the selection, are not currently active. In response to a subsequent interrupt, such as an unmute request, task 9 is again invoked to return the sleeping zones to a full power or an intermediate power level as determined by the policy. In other embodiments, the power management kernel 16 can store a value in the mode switch value in accordance with any of the other policies. In this manner, zones 88 or 89 can be dynamically adjusted to match the performance capabilities of the integrated circuit.

By way of further illustration, consider the effect of task 9 implementing a power management policy to conserve power. In response to the policy, integrated circuit enters a low power mode such that zones 88 are all disabled. Then, if one of the sleeping zones 88 provides a hardware multiplier circuit, any subsequently executed multiplication instruction will need to be handled by a serial multiplier rather than the hardware multiplier circuit. If the workload for integrated circuit changes at later time, a new policy 1, 2 or 3 is selected and zones 88 may be enabled to operate at a newly selected performance level. Thus, any subsequently executed multiplication instruction will be handled by the hardware multiplier circuit in zone 88 rather than by serial multiplication. Although described in conjunction with a multiplier circuit, it will be appreciated that zone 88 may contain other types of devices such as a floating point unit (FPU), a coprocessor, other application specific logic or the like.

Figure 6:
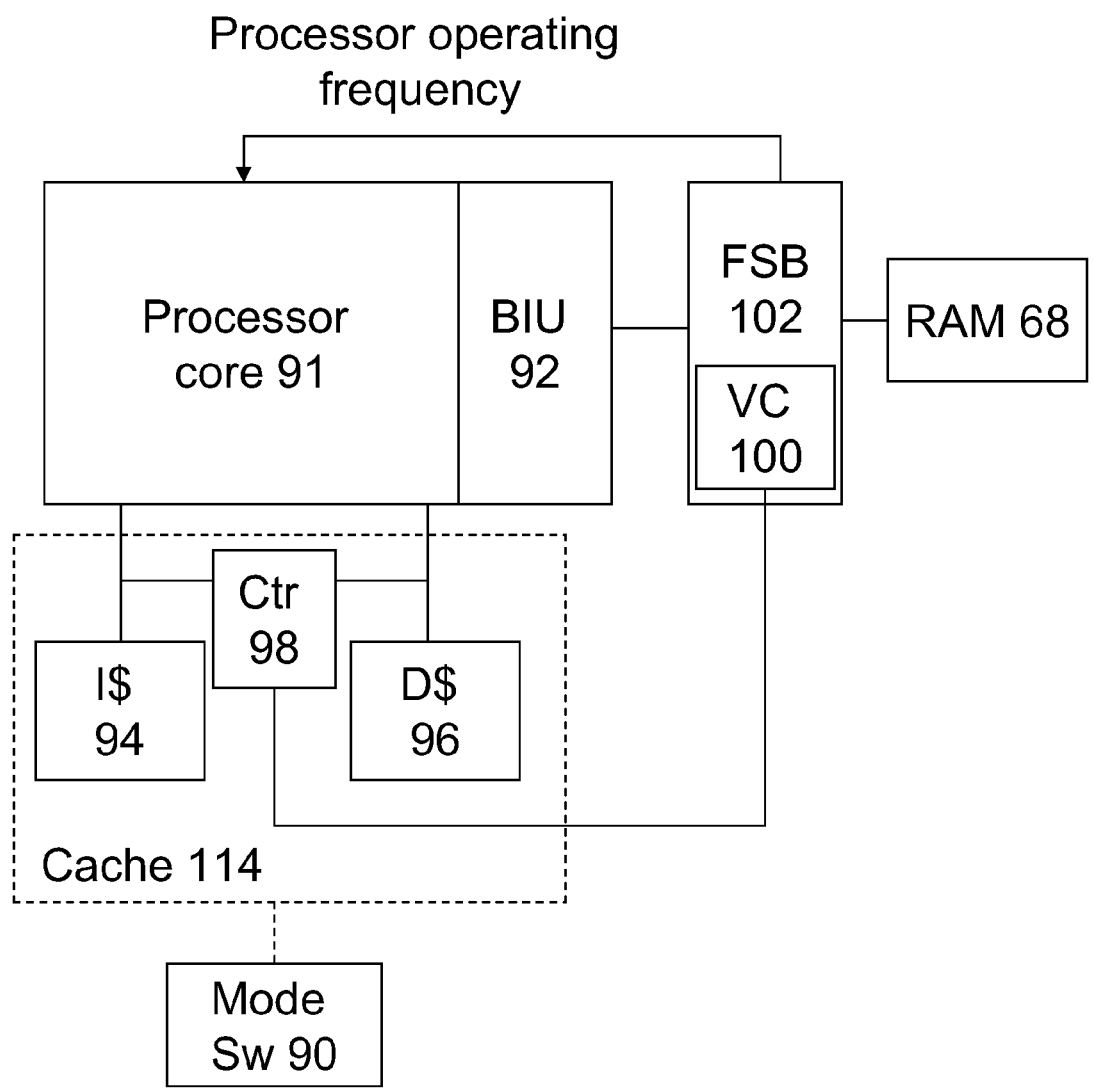
FIG. 6 is a schematic diagram illustrating an integrated circuit using the present techniques in accordance with an embodiment of the present invention.

Refer now to FIG. 6 which schematically illustrates an embodiment of a fine grain power management mechanism in accordance with the present invention that minimizes power by using cache statistics. One skilled in the art will appreciate that L1 cache misses and conditional branches are common problems that cause considerable inefficiencies on the pipeline when the applications require loads or branches. For example, for some applications, 30-40% of executed code can require a load or branch which effectively stalls the pipeline. The fine grain power management mechanism adapts the power and/or frequency for the processor to minimize power. More specifically, if the operating system 2 is able to swap to a different application, then the processor can continue execution of the different application. This of course is only possible so long as other applications are active and scheduled by the operating system. However, if all other applications have stalled, then the pipeline of the processor 66 will stall and the fine grain mechanism is activated.

Advantageously, the fine grain mechanism may be invoked by any of the policies 1-4. Alternatively, the mechanism can be invoked independently to configure the power management kernel to manage power consumption of the integrated circuit 64 on a cycle by cycle basis. In other embodiments, this fine grain power management mechanism is activated at all times and is only disabled by one or more of policies 1-4 when power conservation is not a consideration.

As illustrated in FIG. 6, processor 66 includes a processor core 91 coupled to memory 68 by a bus interface unit (BIU) 92. Processor core 91 stores instructions obtained from memory 68 in an instruction cache 94 and data in a data cache 96 in a manner that is well known in the art. As processor core 91 executes instructions, counter 98 keeps track of cache misses. When the number of cache misses during a selected interval exceeds a selected threshold, a variable frequency counter (VFC) 100 in a Finite State Buffer (FSB) 102 is programmed to run the processor core 91 at a selected (typically slower) speed. If the application program remains active and the number of cache misses increase, the FSB can be programmed, on a cycle by cycle basis, to progressively reduce the operating speed of processor 90 until such time that the data or instructions are returned from memory at which time the original power and clock frequency is restored. It will be appreciated that at each slower operating speed, power is being conserved. Preferably, processor core 91 is returned to the original operating speed whenever the operating system 2 switches to a different application.

In another embodiment, as the number of cache misses during a selected interval exceeds a selected threshold, two events occur concurrently. Specifically, the processor core 91 is operated at a selected (typically slower) speed and voltage and frequency are selectively reduced to control the operating parameters of hardware units 88. If the application program remains active and the number of cache misses increase further, the FSB can be programmed, on a cycle by cycle basis, to progressively reduce the operating speed of processor core 91 and the voltage and frequency in zones 88 are reduced to a minimum (i.e., disabled mode) until such time that the data or instructions are returned from memory. It will be appreciated that at each slower operating speed, additional power is being conserved. Preferably, processor core 91 and zones 88 are returned to the original operating speed whenever the operating system 2 switches to a different application.

Mode switch 90 may be coupled to the cache controller (as illustrated by the dashed line) to selectively implement the above described fine grain control.

Figure 7:
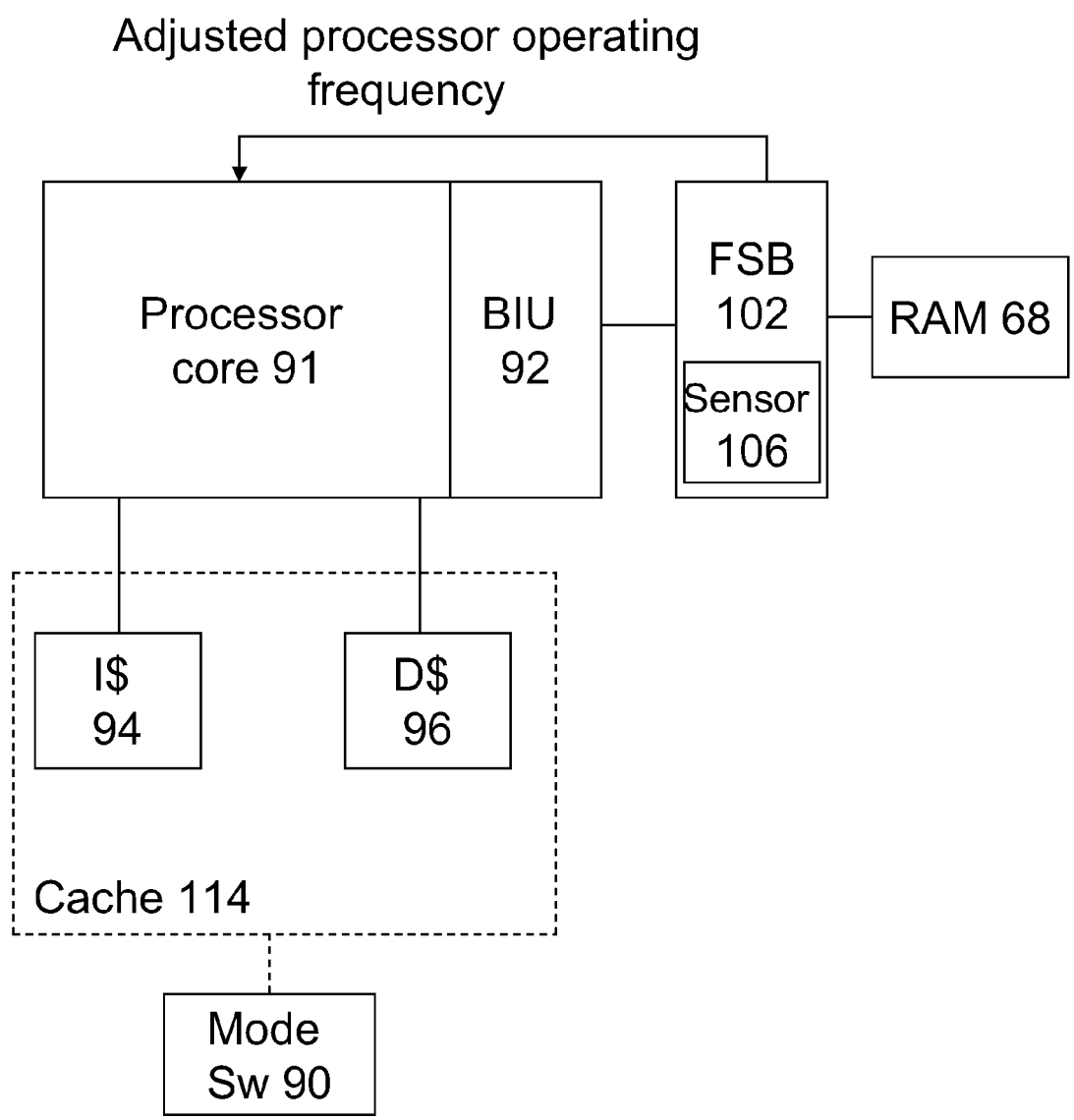
FIG. 7 is a schematic diagram illustrating an integrated circuit using the present techniques in accordance with an embodiment of the present invention.

FIG. 7 schematically illustrates another embodiment of the fine grain power management mechanism where a temperature sensor 106 at the FSB ratio block 102 is used to control frequency ratio, in accordance with an embodiment of the present invention. This fine grain power management mechanism can be invoked in conjunction with any of the policies 1-4. Alternatively, the mechanism can be invoked independently to manage power consumption of the integrated circuit 66 on a cycle by cycle basis by power management kernel 16. In other embodiments, this fine grain power management mechanism is activated at all times and is only disabled by one or more of policies 1-4 when power conservation is not a consideration.

As illustrated in FIG. 7, a processor core 91 is coupled to memory 68 by a bus interface unit (BIU) 92 and a front side bus, FSB 102. Processor core 91 stores instructions obtained from memory 68 in an instruction cache 94 and data in a data cache 96 in a manner that is well known in the art. The FSB 102 is a physical bi-directional data bus that carries the electronic signal information between the processor core or central processing unit (CPU) and the memory controller, which is often referred to as the northbridge. Although not illustrated, some systems may also have a back side bus connecting the processor core 91 to the caches 94 and 96. Caches 94 and 96 may be implemented as either a common block of high speed memory or as a plurality of separate blocks of memory.

As processor core 91 executes instructions and moves data through the FSB 102, the temperature sensor 106 keeps track of localized substrate temperature. As more data is moved through the FSB 102, the localized temperature will increase. Conversely, when the temperature decreases, it may indicate that CPU is stalled or that no applications are active. When the temperature drops to a selected threshold or below, the Finite State Buffer (FSB) 102 is programmed to run the processor core 91 at a selected (typically slower) speed. Preferably, the threshold is set when a watchdog timer times out. The watchdog timer may then be reset whenever the processor core 91 transitions from a sleep mode to an active mode.

Figure 8:
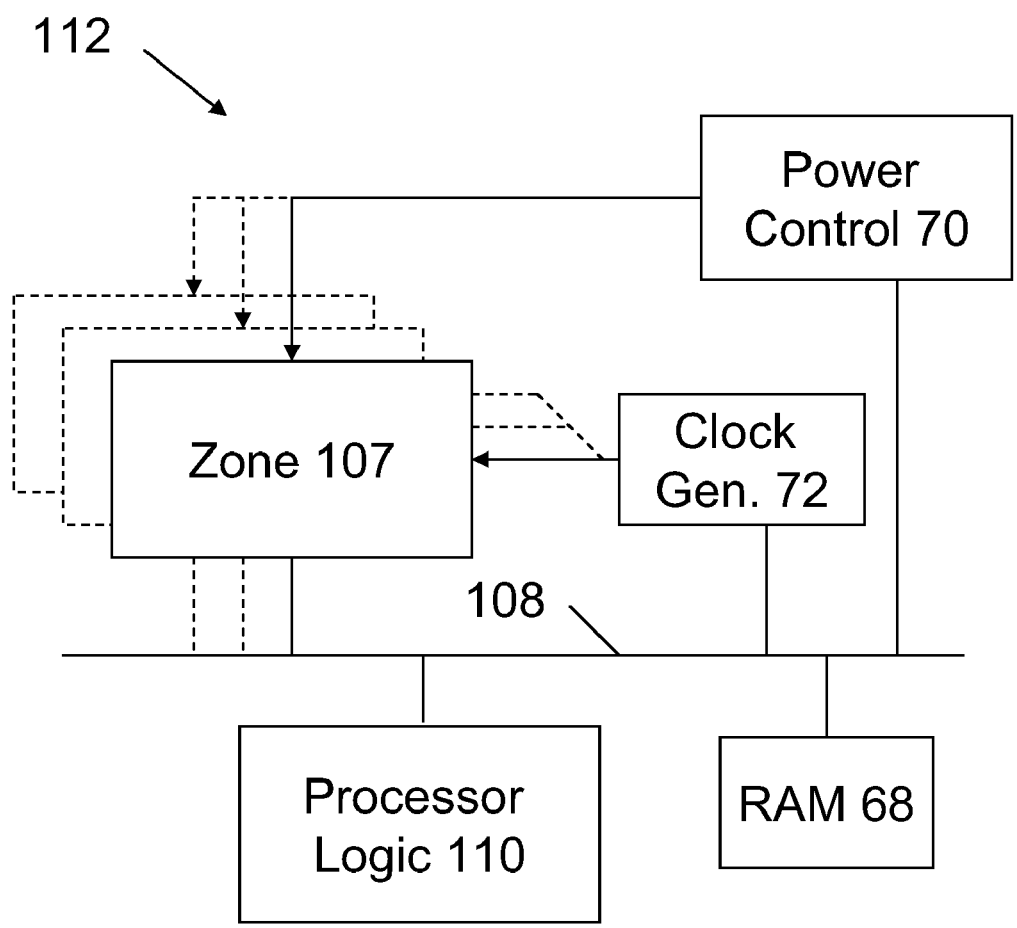
FIG. 8 is a schematic diagram illustrating an integrated circuit using the present techniques in accordance with an embodiment of the present invention.

FIG. 8 illustrates yet another embodiment of the present invention. In this embodiment, a plurality of zones 107 and RAM 68 are illustrated coupled to a bus 108. In one embodiment, zones 107 each comprise at least one processor of a multi-processor system. Each zone 107 may further comprise one or more zones 88. One skilled in the art will appreciate that other functional units, such as one or more caches, a TLB, BIUs may also be coupled to bus 108. Also coupled to bus 108 is processor logic 110 that functions as a system level power manager. Processor logic 110 may be a dedicated stand-alone processor or a thread executing on a multi-threaded processor.

In operation, processor logic 110 functions to manage the power and operating clocks to each zone 107 based on one or more of the above described schemes. Thus, in accordance with the present invention, the applied voltage or the operating frequency or both may be progressively adjusted to match the work load requirements of the SoC 112. Preferably, processor logic 110 communicates with the clock divider 72 and power controller 70 over bus 108. Similarly, processor logic 110 can control the setting of one or more mode switches associated with each zone 107 across bus 108.

To illustrate one power management feature provided by this embodiment, consider system 112 having a DSP (not shown) in one of the zones 107. It will be recognized that the DSP may provide a selected number of bits of resolution. For example, the DSP may provide between 8 bits and 32 bits of resolution. If the current application requires use of the DSP to convert an audio signal and the application indicates that the audio stream comprises voices, resolution is set at, for example, 16 bits. The resolution is set by Policy 4 in response to an indication of the active applications. For example, if system 112 comprises a telephony module as the active application, policy 4 will set resolution of the DSP at 16 bits. In instances where there is only hiss, resolution is changed to 8 bit resolution until voice related activity is again detected. When the audio stream switches to a high fidelity application, such as when the user decides to play music, the DSP is configured to convert the audio stream with a 32 bit resolution. It is noted, that when lower resolution is selected the DSP operates in a lower power mode. Task 9 provides the versatility to select a power saving management mode to quickly response to changing conditions and adjust operating conditions, in addition to voltage and frequency control, to achieve power efficiency.

Figure 9:
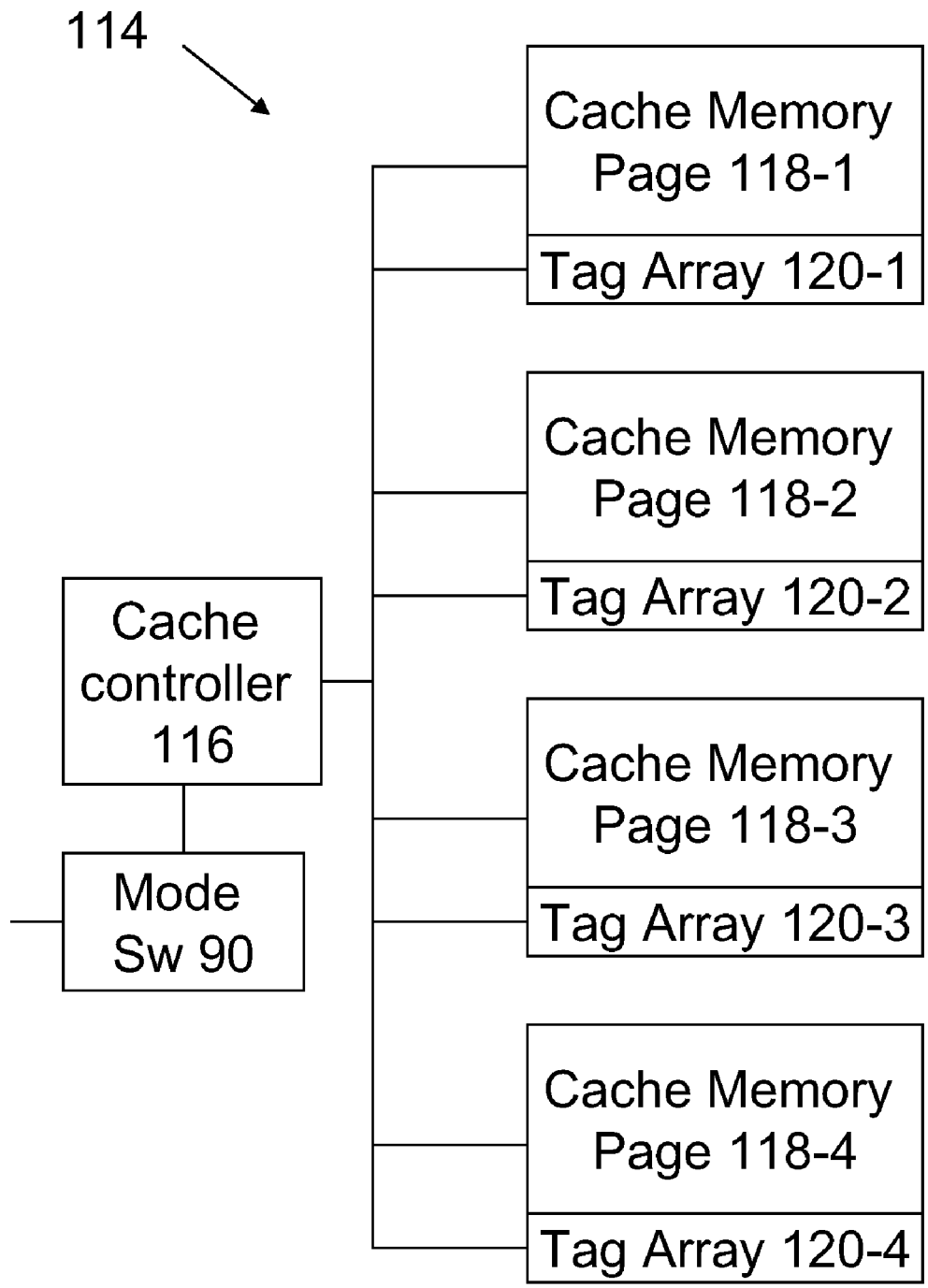
FIG. 9 is a schematic diagram illustrating an integrated circuit using the present techniques in accordance with an embodiment of the present invention.

Refer now to FIGS. 6 and 9. Note that while there may be various mechanisms to automatically manage power within processor core 91, there are many applications where the ability to configure the SoC to manage power in response to real-time demands on the overall system is necessary. For example, in many systems, cache memory is a significant source of power consumption in an embedded device. The ability to select between various operating modes to control power, with a corresponding tradeoff in performance, provides significant flexibility in managing power consumption.

For example, FIG. 9 illustrates a mechanism for selectively controlling power consumption in a system having a cache memory 114. One skilled in the art will appreciate that cache 114 may include instructions stored in an instruction cache and data stored in a data cache in a manner that is well known in the art. In some embodiments, the separate memory and controller are utilized whereas in other embodiments, a common controller are used to store instructions and data in a common cache memory with the division between the instruction cache and the data cache being virtualized. As illustrated, cache 114 is illustrated has having four pages of cache memory 118-1 to 118-4 (collectively referred to as 118) and corresponding tag arrays 120-1 to 120-4 (collectively referred to as 120) which the tag array contains the index of the datum of main memory which has been cached.

If high performance is required, mode switch 90 is configured such that the cache operates in its normal fashion. That is, cache controller 116, cache memory 118 and tag arrays 120 are maintained in a full power mode such that when the processor issues a request for an instruction or data, cache controller 116 first checks whether that memory location is in the cache. This is accomplished by comparing the address of the memory location to all tags in the cache that might contain that address.

If the processor finds that the memory location is in the cache, a cache hit has occurred, otherwise a cache miss has occurred. In the case of a cache hit, the processor immediately reads or writes the data in the cache line. The proportion of accesses that result in a cache hit is known as the hit rate, and is a measure of the effectiveness of the cache.

When mode switch 90 is configured to minimize power but maintain a moderate performance level, both the cache memory 118 and the tag arrays 120 are placed in one of a plurality of power control modes. For example, if the application currently being executed by operating system 2 does not require the highest performance levels, the various cache memory 118 and tag arrays 120 are powered down to a sleep mode until the processor issues a request for an instruction or data. Similarly, the clock frequency is preferably adjusted down to a minimum operating level for cache 112. Upon receipt of the request, cache controller 116 first returns to full power and maximum operating frequency. Cache controller 116 then powers up the tag arrays 120 to compare the address of the requested memory location to all tags in the cache memory that might contain that address. If the processor finds that the memory location is in one of the cache memories, a cache hit has occurred and the respective cache memory page 118 is powered up to an operating mode. In the case of a cache hit, the processor then reads or writes the contents of the cache line. If a cache miss has occurred, the tag arrays are placed in a low power or sleep mode and the request is sent to memory 68.

In one embodiment, all of the tag arrays are powered up together and then the full tag address in each tag array 120 is compared to the address of the requested memory location. In another embodiment, each tag array is powered up, one at a time, and the contents of the powered tag array is compared to the requested address. If power conservation is of paramount concern, it is preferred that the tag arrays are powered up sequentially until either the requested memory location is found in the cache or the requested address has been compared to all of the cached memory locations. The various operating modes, and manner in which the tag arrays are accessed in low power operations is preferably determined by Policy 4 (see FIG. 1) which controls mode switch 90. The operating modes may be determined based on a number of factors such as the number of active applications, the temperature of the SoC and the selected policy that has been selected by the operating system 2.

To illustrate the above, consider the case where the tag array 120-2 contains an address, which for convenience is referred to as "address n" and mode switch 90 specifies maximum power savings. If the processor issues a request to read the contents of memory at address n, the request is initially sent to cache controller 116. At this time controller 116 is returned to an operating mode defined by the mode switch. Note, that the cache memory pages 118 and tag arrays 120 may be in a low power or sleep mode. Controller 116 initially returns tag array 120-1 to an operating state and compares address n to the tags stored in the tag array 120-1. If there are no matches, cache controller 116 returns tag array 120-1 to a sleep mode and returns tag array 120-2 to an operating state. If cache controller 116 find address n among the tags stored in tag array 120-2, a cache hit has occurred. Cache controller 116 then powers up cache memory page 118-2 and transfers the requested data to the processor.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

I claim:

1. A method of controlling power consumption of an integrated circuit, said method comprising:
executing an operating system computer program adapted to execute one or more application computer programs wherein the operating system computer program selects from among the application computer programs for execution by a processor included in the integrated circuit and wherein a first of the application computer programs, when selected by the operating system computer program, is operable to store event data characterizing one or more parameters associated with operation of the integrated circuit in an event data store and to initiate an application specific policy for controlling power consumption of a portion of the integrated circuit; triggering execution of response code, selected by the application specific policy, to read the event data from the event data store and in dependence upon the event data to generate one or more power control commands; and in response to the one or more power control commands, controlling power consumption of a portion of said integrated circuit; wherein said controlling power consumption comprises controlling an operating parameter associated with a hardware unit in one of a plurality of predefined zones of the integrated circuit, whereby the hardware unit is controlled by varying one or both of an operating voltage and a clock speed, and wherein power consumption of separate ones of the plurality of predefined zones is separately controllable.

2. The method of claim 1 further comprising: triggering execution of observation code operable to store event data characterizing one or more parameters associated with an execution event in the event data store when a selected one of the application computer programs, other than the first of the application computer programs, is selected by the operating system computer program; and triggering execution of power management kernel code to determine a policy for controlling power consumption of a portion of the integrated circuit in response to the event data.

3. The method of claim 2, wherein a hook triggers execution of the observation code and a watch dog timer triggers execution of the power management kernel code.

4. The method of claim 1, wherein the first of the application computer programs sets a watchdog timer to a selected value and wherein the operating system computer program is adapted to select a second policy in response to a time out of the watchdog timer.

5. The method of claim 1, wherein the event data includes one or more of: a timestamp; a task identifier associated with a currently executing task; a currently set performance level of the integrated circuit; an identifier associated with an execution event corresponding to the event data; and an indication of one or more idle application computer programs.

6. The method of claim 1, wherein the operating system computer program is operable to schedule execution of the application computer programs and wherein said controlling power consumption comprises controlling power to the hardware unit to provide a substantially minimum level of processing performance required to meet processing requirements of one or more currently executing application computer programs.

7. The method of claim 6, wherein execution of an execution point triggers execution of power management kernel code operable to determine which of a plurality of instances of observation code are associated with the execution point and further comprising triggering execution of the instances of observation code associated with the execution point.

8. The method of claim 7, wherein each instance of observation code has an associated instance of response code and all instances of response code, other than a response code selected by the first application computer program, are triggered to execute from the same stimulus.

9. The method of claim 1 further comprising minimizing processor power in response to the operating system computer program selecting the first application computer program for execution by the processor.

10. The method of claim 9 wherein the first application computer program is selected by the operating system in response to at least one detected cache miss.

11. The method of claim 9 wherein the first application computer program is selected by the operating system in response a detected change in temperature at a bus interface unit.

12. The method of claim 1 wherein the hardware unit comprises one or more of a multiplier and a floating point unit instantiated on the integrated circuit.

13. A method of controlling power consumption of a system having an integrated circuit, said method comprising:

executing an operating system computer program adapted to execute one or more application computer programs wherein the operating system computer program selects from among the application computer programs for execution by a processor included in the integrated circuit and wherein a first of the application computer programs, when selected by the operating system computer program, is operable to store event data characterizing one or more parameters associated with operation of the integrated circuit in an event data store and to initiate an application specific policy for controlling power consumption of a portion of the integrated circuit; determining an operating condition for the portion of the integrated circuit; and controlling the operating condition to manage power consumed by a hardware unit instantiated in one of a plurality of predefined zones of the integrated circuit, wherein power consumption of separate ones of the plurality of predefined zones is separately controllable.

14. The method of claim 13 wherein a mode switch controls an operating parameter of the hardware unit responsive to the operating condition.

15. The method of claim 14 wherein the hardware unit comprises one or more of a multiplier and a floating point unit instantiated on the integrated circuit.

16. The method of claim 13 wherein controlling the operating condition includes controlling an operating voltage of the hardware unit in the predefined zone.

17. The method of claim 13 wherein controlling the operating condition includes controlling an operating frequency of the hardware unit in the predefined zone.

18. The method of claim 13 wherein said determining comprises employing a sensor to detect a temperature at a bus interface and wherein said controlling the operating condition comprises managing power consumed by the hardware unit in the predefined zone in response to the temperature.

19. The method of claim 13 wherein said determining comprises employing a sensor to detect a workload of the processor and wherein said controlling the operating condition comprises managing power consumed by the hardware unit in the predefined zone in response to the detected workload.

20. The method of claim 13 wherein said determining and said controlling are performed by processor logic associated with the integrated circuit.

21. A method of controlling power consumption of an integrated circuit, said method comprising:
    detecting operating conditions of a processor core and a temperature of a bus interface associated with the processor core; selectively executing an application computer program to configure a plurality of mode switches in response to said detecting; and controlling power consumption of a portion of the integrated circuit based on a configuration of the mode switches; whereby said controlling comprises controlling an operating parameter associated with the portion of the integrated circuit responsive to the temperature of the bus interface, and wherein each of the plurality of mode switches controls one of a plurality of predefined zones of the integrated circuit such that power consumption of separate ones of the plurality of predefined zones is separately controllable.

22. The method of claim 21 wherein said controlling comprises controlling operating parameters associated with a power requirement and a performance level for each of the plurality of predefined zones of the integrated circuit in response to a value of a respective one of the mode switches.

* * * * *